Sept. 17, 1963     L. G. SIMJIAN     3,104,314
DEPOSITORY MACHINE COMBINED WITH ANALYZING
AND IMAGE RECORDING MEANS
Original Filed Nov. 25, 1959     3 Sheets-Sheet 2

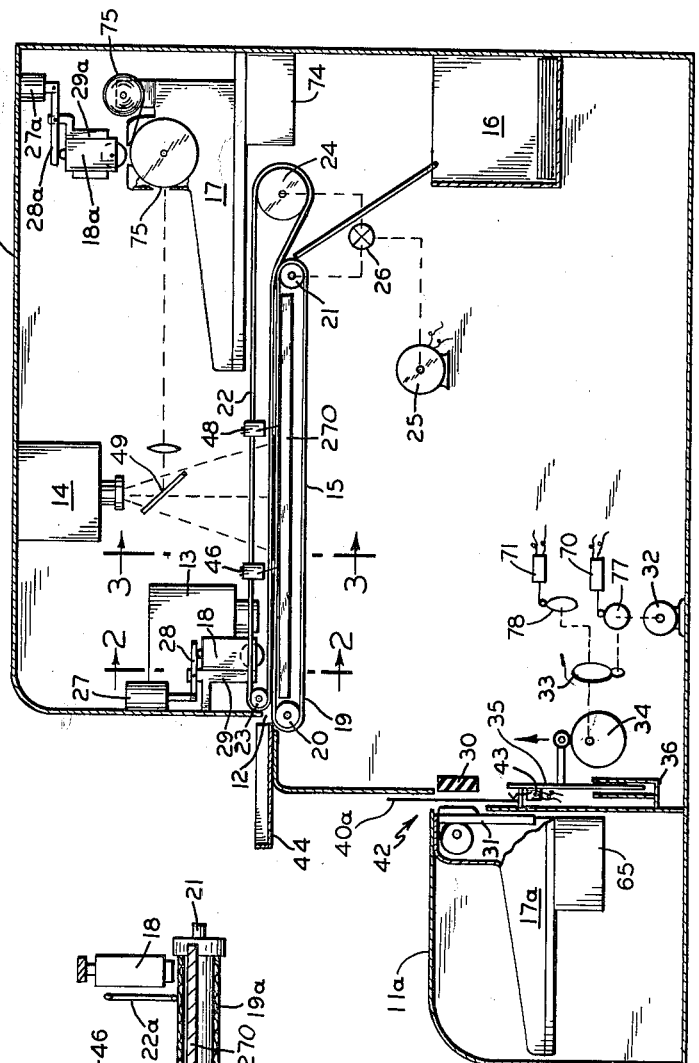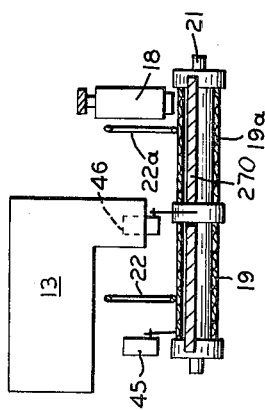

INVENTOR.
LUTHER G. SIMJIAN
BY
AGENT.

United States Patent Office 3,104,314
Patented Sept. 17, 1963

3,104,314
DEPOSITORY MACHINE COMBINED WITH ANALYZING AND IMAGE RECORDING MEANS
Luther G. Simjian, Greenwich, Conn., assignor to Universal Match Corporation, Ferguson, Mo., a corporation of Delaware
Continuation of application Ser. No. 855,413, Nov. 25, 1959. This application Oct. 2, 1962, Ser. No. 230,027
12 Claims. (Cl. 235—61.9)

This invention relates to automatic machines for depositing one or more articles of value and has particular reference to a machine which is adapted to accept and store documents, checks, or money and issues a validated receipt in return for such deposit. More specifically, the machine described hereafter is adapted to accept a deposit in the form of paper money, checks, or documents, analyze the deposit and provide indicia on a receipt responsive to signals developed by a document analyzing means. Additionally, the machine is equipped with image recording means to record an image of each deposited article in identifiable relation with data from the analyzing means so as to produce a suitably correlated record.

This application is a continuation of Serial No. 855,413, filed on November 25, 1959, now abandoned.

In U.S. Patent No. 2,909,107, entitled "Vending Machine Combined With Camera Means," issued October 20, 1959, I have described a vending machine which accepts various articles for deposit and issues an article or receipt in exchange for the accepted article. In U.S. Patent No. 2,930,296, entitled "Method and Apparatus for Collecting an Article for Deposit," issued March 29, 1960, I have described broadly a similar depository apparatus having an image recording means which photographs a deposited article. The apparatus issues a receipt in exchange for the deposited article, which receipt shows an image of the deposited article as reproduced by the image recording means.

The instant apparatus as a further improvement includes analyzing means which is disposed and energized to automatically sense and analyze the articles or documents forming a deposit and to produce certain signals responsive to the type or character of each of the inserted documents, these signals also being used to imprint a receipt which is issued to the depositor. The principle of this method has been disclosed broadly in my U.S. Patent No. 2,936,684, entitled "Depository Machine Combined With Image Recording Means," issued May 17, 1960. As shown hereinafter and in this patent, the signals from the analyzing means are utilized to imprint a record within the apparatus so that the issued receipt and a record maintained in the apparatus show the results of the automatic sensing and analyzing means. Additionally, means are provided to totalize any money bills received, thereby furnishing a receipt which aids the collecting agency as well as the depositor in checking the cash amount of the deposit. Finally, the quantity of other documents, such as checks, is clearly apparent by reference to the receipt or record, respectively.

Another salient and most important feature of the instant machine comprises the arrangement of image recording means so disposed as to view each article or document of the deposit as well as the results of the document sensing and analyzing means and provide a record of the analyzed document correlated with an image of associated data from the sensing and analyzing means.

One of the objects of this invention, therefore, is the provision of an improved method and machine for collecting deposits, avoiding one or more of the disadvantages and limitations of prior art arrangements.

Another object of this invention is the provision of a method and machine adapted to collect articles for deposit, the articles being passed in view of analyzing means to provide signals responsive to the type and character of the article.

Another object of this invention is the provision of a depository machine which combines analyzing means with image recording means to provide positive proof as to the nature and character of the deposited article.

Still another object of this invention is the provision of a depository machine which is adapted to receive documents, such as checks and money bills, and which will not only will distinguish between these two types of articles, but also with respect to the various denominations of money bills, and which will provide a receipt for use by the depositor, the receipt clearly indicating the different types of articles deposited.

Another and further object of this invention is the provision of a machine enabling the deposit of articles and providing proof in the hands of the depositor and machine as to particulars of the deposit.

Other and still further objects of this invention will be apparent from the following description taken in conjunction with the accompanying drawings in which:

FIGURE 1 is a side elevational view, partly in section, of the entire machine;

FIGURE 2 is a view along section lines 2—2 in FIGURE 1;

Figure 3:
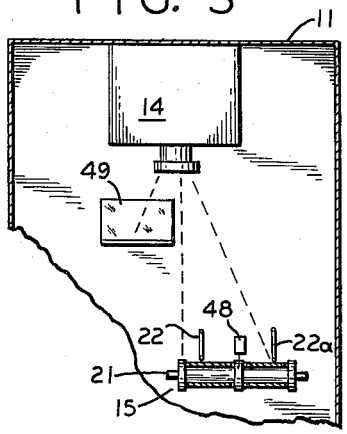
FIGURE 3 is a view along section lines 3—3 in FIGURE 1.

As used hereafter the term "deposit," "articles" or "objects" for deposit shall include but not be limited to money bills, documents, checks or instruments having a value on a negotiable or non-negotiable basis, which are in the possession of a person operating the instant apparatus. A deposit may additionally include specie or other articles which may or may not be passed in view of or in contact with analyzing means adapted to determine the character of the deposit.

Referring now to the figures and FIGURE 1 in particular, an enclosure 11 is provided with an aperture 12, a first indicia application means 18 which comprises a time imprinting means, an additional and similar time imprinting means 18a, a document sensing and analyzing means 13, an image recording means 14, and a conveying means 15; the latter being adapted to guide a deposit tag and articles inserted for deposit through aperture 12, past the indicia application means 18 and the document analyzing means 13, in view of image recording means 14 to a storage receptacle 16. Also included in the enclosure is a bookkeeping or record keeping means 17, preferably a printing calculator, whose purpose and function will be explained later. Near the front of the enclosure 11, there is disposed a sub-enclosure 11a which houses a substantially identical bookkeeping or record keeping means 17a.

The conveying means 15 which guides articles from the aperture 12 to the receptacle 16 comprises a set of flexible, endless belts 19 and 19a, see FIGURE 2, both belts being disposed in the same horizontal plane. The belts pass over and around pulleys 20 and 21. Disposed above the belts there are two narrow belts or cords 22 and 22a which run in conjunction with belts 19 and 19a and act to retain documents flat and in place on the belt as these deposited documents are transported underneath the document analyzing means 13 and pass in view of the image recording means 14. These thin cords are fed about a set of spaced pulleys 23 and 24. Pulley 21 and pulley 24 are driven by an electric motor 25 through a suitable gear box 26. A platen 270 disposed between the run of the conveying belts 19 and 19a supports the entire system in a straight manner and serves also as a pressure plate underneath the indicia application means 18.

The indicia application means 18 and 18a comprise time stamp devices having printing wheel counters which are pulsed every minute by a synchronous motor so that the printing wheels always indicate the time of day on a 24-hour basis. This type of printing counter is commercially available and used widely, for example, in conjunction with clocks which stamp attendance or time records. The stamping devices are suitably mounted in support means 29 and 29a respectively, and are actuated for printing by solenoids 27 and 27a and associated respective levers 28 and 28a.

The bookkeeping or record keeping means 17 and 17a are commercial printing calculators which imprint indicia upon paper, the indicia being responsive to the operation of keyboard levers. These machines, as is well known, include an add key to imprint the individual entry and a totaling key to imprint on the record an amount responsive to the totalized value of the individual entries. In the instant device the keyboard is actuated by solenoids coupled to the desired keys. In the printing calculator 17, the indicia provided by the apparatus are imprinted on a conventional roll of recording paper, the latter being advanced automatically by the calculator after each indicia imprinting operation. In companion printing calculator 17a, the usual roll and platen have been removed so that the printing or type bars 31 act against a stationary platen 30. Receipts imprinted by calculator 17a are caused to index in vertical direction by means of motor 32, gear train 33, cam 34 and slide 35, the latter being constrained in guide 36. A complete rotation of cam 34 drives slide 35 from its minimum down to maximum up position.

Figure 6:
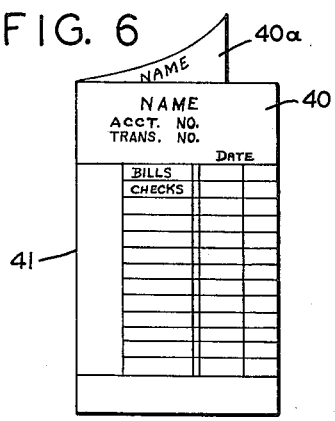
FIGURE 6 is an illustration, partly in perspective, of a typical deposit tag or slip for use by a depositor.

FIGURE 6 shows a typical deposit tag or slip of the type used in the instant machine. Two identical paper forms are joined by a perforated line 41. The paper is suitably impregnated and treated so that when the depositor writes on the form 40, the writing copies onto the form 40a. This type of pressure sensitive paper is well-known and used widely by commercial banks and other institutions in conjunction with posting machines of the National Cash Register Company, Dayton, Ohio. The depositor, in using the deposit forms of FIGURE 6, fills in the articles of the deposit, listing checks separately, item by item, and then by means of an imprinting device and identification card, the depositor's name, address, account number together with a transaction number and date are stamped onto a predetermined portion. This operation is accepted standard practice except for the assigning of the transaction number and the date; but it will be obvious to those skilled in the art that this additional information readily can be included in the standard and commercially available imprinting device. If desired, in an alternative arrangement, the customer may be provided with a supply of preprinted receipts which show the data indicated above.

Operation of the instant machine starts when the depositor separates the deposit forms or tags along the perforation 41 and places the second tag 40a in the aperture 42, where it is engaged by the slide 35, so that this tag can be provided with indicia responsive to the actuation of the printing calculator 17a as a receipt. The insertion of this deposit tag causes actuation of the switch 43, thereby energizing the motor 25 and setting the conveyor system 15 in operation.

The first deposit tag 40 is deposited flat on a tray 44 and fed into the aperture 12 where it is gripped by the belts 19 and 19a and the cords 22 and 22a which carry this tag past the various stations to the receptacle 16.

The deposit tag 40, which is made to be wider than a conventional money bill, actuates switch 45 (FIGURE 2) which in turn causes operation of a slow to make time delay 47 (FIGURE 7) and subsequent energization of the solenoids 27 and 27a to operate both time imprinting devices. The action of the relay 47 provides a momentary pulse enabling the deposit tag 40 to be imprinted with indicia such as time, without having to stop underneath the indicia application means. By virtue of the actuation of the imprinting means 18a, a corresponding and preferably identical indicia notation is provided on the record paper associated with the printing calculator 17, thereby assuring that the indicia affixed to the deposit tag 40 and on the record within the machine are correlatable. The information affixed at this instant, namely time or similar information, may be considered predetermined data since these data are not related to the characteristics or nature of the deposited article. The document sensing and analyzing means 13 which is constructed to recognize money bills, discerns no information peculiar to money bills as the deposit tag passes underneath. Subsequently, the deposit tag 40 reaches the position where it is in the view of the image recording means or camera 14. A switch 48 is actuated by the deposit tag and in turn the electrically powered camera 14 is operated to photograph an image of the deposit tag on the conveyor. Thereafter, the deposit tag reaches the receptacle 16. Operation of the camera involves tripping the shutter and advancing the film by one frame, an arrangement which is well known in the microfilm art.

After the deposit tag, the bills and checks are fed sequentially into the machine in the same manner. The money bills and checks, being of narrower width, fail to trip the switch 45 so that the imprinting means remain de-energized. As a money bill passes underneath the analyzing means, the bill is sensed for its denomination. An inspection of money bills will reveal that each particular denomination thereof has a pattern of a distinct number and arrangement of scroll lines near its edge and that this pattern is sufficiently distinct for energizing the sensing and analyzing means to provide a signal which is peculiar to the respective denomination. The analyzing means, as will be described later, is provided with photoelectric means and a slit aperture to receive a pattern responsive signal and to develop electrical signals which are related to the number of light and dark lines on each bill. Each denomination will therefore cause the moving contact of a stepping switch 64 (FIGURE 7) to advance a given number of positions. The fixed contacts of this switch are connected in such a manner that a particular fixed contact becomes connected to the moving contact upon sensing a predetermined pattern, establishing a circuit which is operative only for the particular denomination sensed. The stepping switch 64, which thus assumes a position responsive to the denomination of the sensed bill, causes energizing of the corresponding input solenoids on the printing calculators 17 and 17a, the latter being connected in parallel to cause simultaneous application of denomination indicative indicia onto the deposit tag 40a and the record paper 75 which is associated with calculator 17.

When the analyzed money bill subsequently reaches the image recording position and actuates the switch 48, an image of the money bill is recorded together with the denomination indicative indicia apparent on record, 75, by means of an inclined mirror 49.

In the event that a check or other non-money-bill documents pass underneath the document analyzing means 13, no pattern of the type found on money bills is sensed and the stepping switch 64 is advanced to a position at which a connection is established to a circuit which causes energization of a printing key solenoid "DOC," signifying that a document was inserted into the instant machine. The "DOC" information will be printed by the printing calculators 17 and 17a and will be photographed by the image recording means 14 in co-relation with the image of the document.

Figure 5:
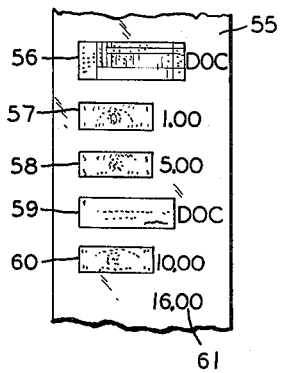
FIGURE 5 illustrates a portion of a film strip provided by the image recording means shown in FIGURE 1.

A typical film strip portion is shown in FIGURE 5 which depicts a complete record of a typical deposit. The film strip 55 shows from top to bottom the image of a deposit tag 56, the image of a $1 bill 57 associated with numerical indicia seen via the mirror 49 as provided by the printing calculator 17, the image of a $5 bill 58, associated with its indicia, a check or document 59 together with the letters "DOC," a money bill 60 of $10 denomination and a totalized sum 61 of $16. This last value has been provided by the printing calculator 17 and the calculator 17a in response to the operation of totalizing switch 73 (FIGURE 7) which, inter alia, actuates the total key solenoid to cause a corresponding imprinting of record 75 and of deposit tag 40a. The deposit tag 40a then is available as a validated receipt to the depositor while the duplicate record 75 remains within the machine.

It will be noted that the deposit tag 40a, as well as the record 75 associated with the printing calculator 17 retained within the machine, list sequentially, item for item, the character of each document inserted for deposit, that is; money bill or other document, and that in the case of money bills the denomination as sensed by the analyzing means is also recorded.

Since a depositor has filled out his tags 40 and 40a in advance in the conventional manner, the printed indicia provide a check as to the accuracy of either the depositor's listing or the operation of the machine and its associated sensing and analyzing means. In the event of discrepancy, the film provided by the image recording means can be projected and an inspection of each deposited item can be accomplished together with an examination of the associated denomination indicia as provided by the printing means.

FIGURE 2 shows the roller 21, the belts 19 and 19a as well as the cords 22 and 22a thereabove. The switch 46 is disposed in the gap between the belts so that it will be actuated by each article of the deposit. The purpose of this switch will be described in conjunction with FIGURE 7. The switch 45 is located to the side where only the deposit tag, which is wider than checks or money bills, will cause the actuation of the imprinting solenoids 27 and 27a.

FIGURE 3 shows the relationship of the image recording means 14, the mirror 49 and the conveyor system 15. The switch 48 is disposed in the gap between the set of belts to cause operation of the image recording means in response to a document being guided along the path from the aperture 12 to the storage receptacle 16.

Figure 4:
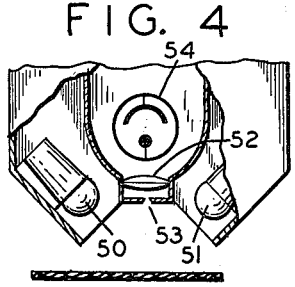
FIGURE 4 is an enlarged view partly in section of the document sensing and analyzing means used in FIGURE 1.

FIGURE 4 is an enlarged view of the analyzer head and consists mainly of illuminating sources 50 and 51 which are placed to illuminate an area of the article under analysis. A lens system 52 focuses the amount of light reflected from the surface of the article under analysis through a slit 53 onto a photo-electric tube 54. The number of lines or the distinctive pattern on a given section of the document under analysis thereby can be determined and pattern responsive signals can be evolved.

It will be noted that the document sensing and analyzing means described hereinabove is similar to the scheme and arrangement disclosed and described in my U.S. Patent No. 2,941,187, entitled "Apparatus and Method for Determining the Character of a Document," issued June 14, 1960.

Alternatively, an analyzing means as described for example in U.S. Patent No. 2,896,763 to D. G. Gisser et al., entitled "Vending Machine," issued July 28, 1959, or in U.S. Patent No. 2,552,156 to H. De France, entitled "Numbers Reading Device," issued May 8, 1951, or in U.S. Patents to D. H. Shepard, Nos. 2,897,481 and 2,663,758, entitled "Apparatus for Reading," issued July 28, 1959, and December 22, 1953, respectively, may be used.

It will be apparent to those skilled in the art that any document sensing and analyzing means may be used which is capable of determining with certain reliability the characteristics and nature of the document deposited, that is, whether the document is a money bill or not and whether the document under analysis falls within certain pre-selected denominations.

Figure 7:
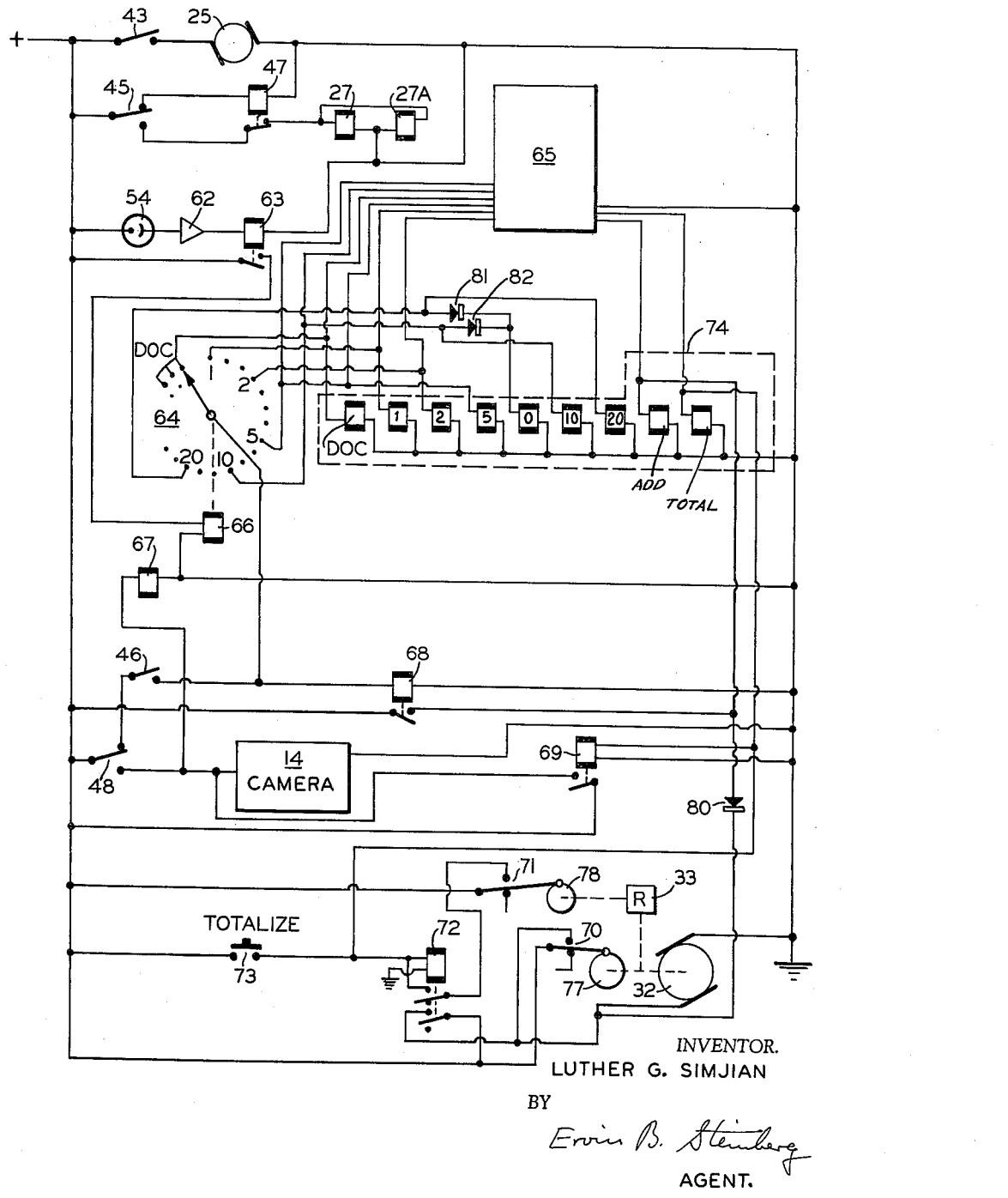
FIGURE 7 is a schematic circuit diagram of the machine showing the necessary electrical circuit elements in coactive relationship.

Description of Circuit Diagram, FIGURE 7

The switch 43 is actuated by the second deposit tag 40a which is inserted by the depositor into the aperture 42 and removed therefrom after the total deposit has been effected. The closing of the switch 43 energizes motor 25 to operate the conveying means 15. The switch 45 is actuated by the deposit tag 40 as the latter is guided from the aperture 12 to the receptacle 16, and the actuation of this switch pulses the imprinting solenoids 27 and 27a via the time delay relay 47 and its associated contact.

Upon the insertion of documents at the aperture 12, light pulse signals provided by the passage of the document under the light sources 50 and 51 are sensed by a phototube 54 of the sensing and analyzing means 13, are amplified by an amplifier 62, and fed to a keying relay 63 whose associated contact advances the movable contact of stepping switch 64 via its motor solenoid 66. Deposit tags and checks will cause some stepping of the stepping switch movable contact, but will exhibit fewer scroll lines than money bills, or lack certain characteristics associated with money bills. The first few contacts of the stepping switch are, therefore, connected together and, in turn, are connected to the solenoid entitled "DOC," signifying "document."

One set of solenoids is attached to keys "DOC," "1," "2," "5," "0," "10," "20," "ADD," and "TOTAL," and is housed in an enclosure 74 (FIGURE 1) for operating the proper printing keys in the aforementioned printing calculator 17. An identical group of solenoids, connected in parallel is located in an enclosure 65 (FIGURE 1) and performs the identical function in connection with the printing calculator 17a.

While the stepping switch, in response to the signals from the phototube 54, has advanced the appropriate number of contacts depending on the denomination of the bill, the bill has advanced also along its path and actuates the switch 46, located to the right of the analyzing means 13 in FIGURE 1. The closing of the switch 46 applies power to the proper calculator key solenoid through the moving arm of the stepping switch and also energizes a slow to make time delay relay 68. The energizing of this time delay relay causes, after an interval of time long enough for the proper key to be set up, the operation of the "ADD" solenoid. The document character or denomination responsive indicia thus are imprinted onto the record tape 75 which is associated with the calculating device 17 and also onto the deposit tag 40a which is associated with the calculating device 17a. The tape 75 is advanced automatically by the calculator 17 after each entry in a manner that is well known in the art.

It will be apparent that after an entry has been performed on the tag 40a, the tag must be moved upward in a line-by-line fashion. This task is accomplished by energizing the motor 32 which receives its power via the contact associated with the relay 68. One revolution of the output shaft of the motor 32, as governed for one cycle of operation by a dimple cam 77 coupled thereto and a follower switch 70, effects an incremental movement of the eccentric cam 34 (FIGURE 1) which, in turn, indexes the slide 35 and the deposit receipt 40a in the upward direction.

The switch 48 which is tripped by the leading edge of each deposited article (FIGURE 1) actuates the camera 14 and also the reset solenoid 67 of the stepping switch 64. In this manner, the camera is actuated to record an image of the document and of the indicia appearing on the printed record, and concurrently, the stepping switch is reset to its starting position so as to be ready for signals upon the receipt of a new document. When all of the items of a deposit have been inserted at the aperture 12 and have been guided to the receptacle 16, a totalizing button 3 disposed on the front of the machine is depressed. The closing of this switch 73 energizes a relay 72 which, in turn, locks up through a switch 71, the latter being controlled by a dimple cam 78 which is driven by the motor 32 through the gear reduction 33 to complete one full revolution with the cam 34. The motor 32 thus runs until the cam 34 returns the slide 35 to its lowermost position and the cam 78 opens the switch 71 and de-energizes relay 72. When the switch 73 is operated, the "TOTAL" solenoids of the printing calculators are also actuated to imprint the totalized value of the money bill denominations onto the record tape and onto the deposit tag. Furthermore, the time delay relay 69 is energized to cause operation of the camera to record the totalized value, this entry being depicted at numeral 61 in FIGURE 5.

A rectifier 80 is provided to prevent the actuation of the key solenoids while the motor 32 is operating. Rectifiers 81 and 82 have been provided since on some types of printing calculators the "1," "2," "5," and "0" keys are in the units column while "10" and "20" keys are in the tens column and also require the actuation of the "0" key in the units column for complete recording. Other types of calculators have different methods of operation and rectifiers 81 and 82 may not be required.

It will be apparent to those skilled in the art that coin money can be deposited in a separate aperture which leads to a coin sorting and counting machine. The totalized value of the coin deposit, as determined by the counting machine, may then be imprinted on the receipt 40a and on the record 75.

In an alternative embodiment, the results of the document sensing and analyzing means and of the coin deposit may be displayed for photography on digit displaying lamps or electron tubes. Such an arrangement would obviate the need for the image recording means to be in visual communication with the printing calculator 17.

Finally, it will be apparent to those skilled in the art that instead of imprinting indicia, perforations or other significant and recognized marking or indicia means may be used without deviation from the arrangement disclosed hereinabove.

While there have been described and illustrated certain features and embodiments of the present invention, it will be apparent to those skilled in the art that various changes and modifications may be made therein without departing from the spirit and intent of the present invention which shall be limited only by the scope of the appended claims.

I claim:

1. In a depository machine the combination of: aperture means adapted to accept from a depositor articles for deposit and a first and a second tag; guide means adapted to guide the first tag and articles deposited thereupon from said aperture means to a storage receptacle; document analyzing means and a first indicia application means disposed along the path of said guide means; a second indicia application means disposed to apply indicia to said second tag; a third indicia application means disposed within said machine and cooperating with further record means; said first and third indicia application means being actuated upon receiving said first tag and providing said first tag and said further record means with predetermined data; said analyzing means being actuated upon articles being deposited on said guide means and providing signals responsive to the character of each deposited article; said second and third indicia application means connected to receive said signals from said analyzing means and providing corresponding indicia on said second tag and on said further record means respectively, and means enabling a depositor using the machine to obtain possession of said second tag which has been provided with indicia responsive to the signals from the analyzing means.

2. In a depository machine the combination of: aperture means adapted to accept from a depositor money bills for deposit and a first and a second tag; guide means adapted to guide the first tag and said money bills deposited thereupon sequentially from said aperture means to a storage receptacle; document analyzing means and a first indicia application means disposed along the path of said guide means; a second indicia application means disposed to apply indicia to said second tag; a third indicia application means disposed within said machine and cooperating with further record means; said first and third indicia application means being actuated upon receiving said first tag and providing said first tag and said further record means with predetermined data; said analyzing means being actuated upon money bills being deposited on said guide means and said analyzing means providing signals indicative of the denomination of the deposited money bill; said second and third indicia application means connected to receive said signals from said analyzing means and providing corresponding indicia on said second tag and on said further record means respectively, and said second and third indicia application means including totalizing means to provide said second tag and said further record means with indicia indicative of the totalized value of said money bills.

3. In a depository machine the combination of: aperture means adapted to accept from a depositor articles for deposit and a first and a second tag; guide means adapted to guide the first tag and articles deposited thereupon from said aperture means to a storage receptacle; document analyzing means and a first indicia application means disposed along the path of said guide means; a second indicia application means disposed to apply indicia to said second tag; a third indicia application means disposed within said machine and cooperating with further record means; said first and third indicia application means being actuated upon receiving said first tag and providing respectively said first tag and said further record means with predetermined data; said analyzing means being actuated upon articles being deposited on said guide means and providing signals responsive to the character of each deposited article; said second and third indicia application means connected to receive said signals from said analyzing means and providing corresponding indicia on said second tag and on said further record means respectively; means enabling a depositor using the machine to obtain possession of said second tag which has been provided with indicia responsive to the signals from the analyzing means; image recording means disposed to view each of said deposited articles and also the indicia provided by said third indicia application means, and said recording means being actuated to produce an image of said article and of the article character responsive indicia in identifiable relationship to one another.

4. In a depository machine the combination of: aperture means adapted to accept from a depositor money bills for deposit and a first and a second tag; guide means adapted to guide the first tag and said money bills deposited thereupon sequentially from said aperture means to a storage receptacle; document analyzing means and a first indicia application means disposed along the path of said guide means; a second indicia application means disposed to apply indicia to said second tag; a third indicia application means disposed within said machine and cooperating with further record means; said first and third indicia application means being actuated upon receiving said first tag and providing respectively said first tag and said further record means with predetermined data; said analyzing means being actuated upon money bills being deposited serially on said guide means and providing signals responsive to the denomination of each deposited article; said second and third indicia application means connected to receive said signals from said analyzing means and providing corresponding indicia on said second tag and on said further record means respectively; said second and third indicia application means including totalizing means to provide said second tag and said further record means with indicia indicative of the totalized value of said money bills; image recording means disposed to view each of said accepted money bills and also the denomination responsive indicia provided by said third indicia application means, and said recording means being actuated to produce an image of each money bill and of the denomination responsive indicia in identifiable relationship to one another.

5. In a depository machine, the combination of: an enclosure; aperture means in said enclosure for accepting from a depositor a deposit which includes such articles as a deposit tag and paper currency documents; indicia application means disposed in said enclosure; conveying means disposed to receive the articles at said aperture means and transport each article in sequence past said indicia application means; control means connected to said application means, and said control means causing actuation of said application means in response to the passing of a deposit tag past said indicia application means to provide identifying indicia on said tag while omitting said actuation and application of indicia when a currency document passes said indicia means.

6. In a depository machine, the combination of: an enclosure; aperture means in said enclosure for accepting from a depositor a deposit which includes such articles as a deposit tag and paper currency; indicia application means disposed in said enclosure; conveying means disposed to receive the articles at said aperture means and transport each article in sequence past said indicia application means; control means disposed along the path of the conveying means and adapted to sense the presence of a deposit tag; said control means connected to said application means for causing actuation thereof when a deposit tag passes said indicia application means whereby to provide identifying indicia on said tag while omitting said actuation and application of indicia when paper currency passes said indicia means.

7. In a depository machine, the combination of: aperture means adapted to accept from a depositor a deposit which includes such articles as a deposit tag, paper currency and checks; analyzing means disposed for analyzing the character of the articles accepted at said aperture means; conveying means disposed for receiving said deposit tag, paper currency and checks at said aperture means and transporting each article sequentially past said analyzing means; a further tag, indicia application means connected to said analyzing means and cooperating with said further tag for providing thereupon indicia responsive to the character of each article fed past said analyzing means; means for moving said tag and articles after having passed said analyzing means to storage means which are disposed inaccessible to the depositor, and means rendering available to the depositor said further tag to which indicia have been affixed by said indicia application means.

8. In a depository machine, the combination of: aperture means adapted to accept from a depositor a deposit which includes such items as a depositor identifying deposit tag, paper currency and checks; analyzing means disposed for analyzing the character of each item accepted at said aperture means; conveying means disposed for receiving said depositor identifying deposit tag, paper currency and checks at said aperture means and transporting each item sequentially past said analyzing means to a storage means which is disposed inaccessible to the depositor; a further tag; indicia application means connected to said analyzing means and cooperating with said further tag for providing sequentially thereupon indicia responsive to the character of each item fed past said analyzing means, and means rendering available to the depositor said further tag to which indicia have been affixed by said indicia application means whereby said further tag serves as an itemized and validated receipt.

9. In a depository machine, the combination of: aperture means adapted to accept from a depositor a deposit which includes such articles as a depositor identifying deposit tag, paper currency and checks; analyzing means disposed for analyzing the character of each article accepted at said aperture means and providing indicia responsive to the character of each article; conveying means disposed for receiving said depositor identifying deposit tag, paper currency and checks at said aperture means and conveying each article sequentially to said analyzing means whereby said analyzing means sequentially provides said indicia; image recording means disposed for viewing each article accepted at said aperture means and viewing also the indicia provided by said analyzing means; means causing operation of said image recording means subsequent to the operation of said analyzing means whereby to produce in associated identifiable relationship a recorded image of each article and of the indicia pertaining thereto as provided by said analyzing means; said conveying means transferring said articles after having passed said analyzing means to storage means disposed inaccessible to the depositor, and means for rendering to the depositor a receipt which carries indicia responsive to the operation of said analyzing means.

10. In a depository machine, the combination of: aperture means adapted to accept from a depositor a deposit which includes such items as a depositor identifying deposit tag, paper currency and checks; analyzing means disposed for analyzing the character of each item accepted at said aperture means and said analyzing means providing indicia responsive to the character of each item analyzed; conveying means disposed for receiving said depositor identifying deposit tag, paper currency and checks at said aperture means and transporting each item sequentially past said analyzing means whereby said analyzing means sequentially provides said indicia; image recording means disposed for viewing each item of deposit accepted at said aperture means and viewing also the indicia provided by said analyzing means; means causing operation of said image recording means in response to the operation of said analyzing means whereby to produce in associated identifiable relationship a recorded image of each item and of the indicia pertaining thereto as provided by said analyzing means; said conveying means transferring said items of deposit after having passed said analyzing means to storage means disposed inaccessible to the depositor; a printing means connected to said analyzing means; said printing means adapted to engage a receipt form, and said recipt form being imprinted by said printing means in response to the operation of said analyzing means whereby said form serves as an itemized receipt for said deposit.

11. In a depository machine, the combination as set forth in claim 10 wherein said receipt form is provided to said printing means by the depositor.

12. In a depository machine, the combination of: aperture means adapted to accept from a depositor a deposit which includes such items as a depositor identifying deposit tag, paper currency and checks; analyzing means disposed for analyzing the character of each item accepted at said aperture means and said analyzing means providing indicia responsive to the character of each item analyzed; conveying means disposed for receiving said depositor identifying deposit tag, paper currency and checks at said aperture means and transporting each item sequentially past said analyzing means whereby said analyzing means sequentially provides said indicia; image recording means disposed for viewing each item of deposit accepted at said aperture means and viewing also the indicia provided by said analyzing means; means causing operation of said image recording means in response to the operation of said analyzing means whereby to produce in associated identifiable relationship a recorded image of each item and of the indicia pertaining thereto as provided by said analyzing means; said conveying means transferring said items of deposit after having passed said analyzing means to storage means disposed inaccessible to the depositor; a printing means connected to said analyzing means; said printing means adapted to engage a receipt form for imprinting the latter with indicia responsive to the operation of said analyzing means whereby said form when imprinted serves as an itemized receipt of said deposit rendered available to the depositor; further indicia means disposed along the passage of said deposit tag from said aperture means to said storage means; sensing means for sensing the presence of a deposit tag along said passage; said sensing means connected to said further indicia means for causing the indicia means to affix indicia to said deposit tag subsequent to its receipt in said aperture means while omitting affixing of indicia to paper currency.

References Cited in the file of this patent

UNITED STATES PATENTS

| | | |
|---|---|---|
| 2,100,061 | Sundelin et al. | Nov. 23, 1937 |
| 2,922,893 | Ett | Jan. 26, 1960 |
| 2,923,587 | Zipf | Feb. 2, 1960 |
| 2,932,392 | Burtnier et al. | Apr. 12, 1960 |
| 2,964,641 | Selgin | Dec. 13, 1960 |

FOREIGN PATENTS

| | | |
|---|---|---|
| 605,678 | Germany | Nov. 16, 1934 |